(12) United States Patent
Zhang et al.

(10) Patent No.: US 12,174,976 B2
(45) Date of Patent: Dec. 24, 2024

(54) INFORMATION PROCESSING DEVICE, INFORMATION PROCESSING METHOD, AND DISTRIBUTED COMPONENT

(71) Applicant: Sony Group Corporation, Tokyo (JP)

(72) Inventors: Zhihui Zhang, Beijing (CN); Weibin Shi, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/454,071

(22) Filed: Aug. 23, 2023

(65) Prior Publication Data

US 2023/0394162 A1    Dec. 7, 2023

Related U.S. Application Data

(63) Continuation of application No. 17/220,939, filed on Apr. 2, 2021, now Pat. No. 11,748,498, which is a
(Continued)

(30) Foreign Application Priority Data

Feb. 4, 2016    (CN) .......................... 201610079736.1

(51) Int. Cl.
*G06F 21/60* (2013.01)
*B33Y 50/00* (2015.01)
(Continued)

(52) U.S. Cl.
CPC ............ *G06F 21/608* (2013.01); *B33Y 50/00* (2014.12); *G06F 3/12* (2013.01); *G06F 3/1205* (2013.01);
(Continued)

(58) Field of Classification Search
CPC ........ G06F 21/608; G06F 3/12; G06F 3/1205; G06F 3/1225; G06F 3/1226;
(Continued)

(56) References Cited

U.S. PATENT DOCUMENTS 6,789,194 B1 * 9/2004 Lapstun ............... B41J 2/17513
713/176
2002/0069179 A1    6/2002 Slater et al.
(Continued)

FOREIGN PATENT DOCUMENTS

| CN | 103593150 A | 2/2014 |
|----|-------------|--------|
| CN | 104484584 A | 4/2015 |

(Continued)

OTHER PUBLICATIONS

English translation of International Search Report issued Apr. 28, 2017 in PCT/CN2017/072475.

*Primary Examiner* — Abu S Sholeman
(74) *Attorney, Agent, or Firm* — XSENSUS LLP

(57) ABSTRACT

An information processing device according to one embodiment of the present disclosure comprises a processor. The processor is configured to generate a distributed component aimed at a three dimensional printing task. The distributed component is used for controlling, independent of the information processing device, execution of the three dimensional printing task after establishing a connection with a user equipment, and comprises decryption information of three dimensional model data used for the three dimensional printing task. The processor is further configured to control the arrangement of the distributed component to the user equipment.

6 Claims, 15 Drawing Sheets

Related U.S. Application Data continuation of application No. 16/075,311, filed as application No. PCT/CN2017/072475 on Jan. 24, 2017, now Pat. No. 10,997,305.

(51) Int. Cl.
  *G06F 3/12* (2006.01)
  *G06F 21/10* (2013.01)
  *G06F 21/44* (2013.01)
  *G06F 30/00* (2020.01)

(52) U.S. Cl.
  CPC .......... *G06F 3/1225* (2013.01); *G06F 3/1226* (2013.01); *G06F 3/1238* (2013.01); *G06F 3/1289* (2013.01); *G06F 21/10* (2013.01); *G06F 21/445* (2013.01); *G06F 21/60* (2013.01); *G06F 30/00* (2020.01)

(58) Field of Classification Search
  CPC ...... G06F 3/1238; G06F 3/1289; G06F 21/10; G06F 21/445; G06F 21/60; G06F 30/00; G06F 3/1224; G06F 3/1237; G06F 3/1287; G06F 21/30; B33Y 50/00; H04L 9/3247; H04L 9/3263; H04L 63/0428; H04L 67/10; H04L 2209/72
  See application file for complete search history.

(56) References Cited

U.S. PATENT DOCUMENTS

| | | | |
|---|---|---|---|
| 2005/0268090 A1* | 12/2005 | Saw ...................... | G06F 21/608 713/156 |
| 2006/0075241 A1* | 4/2006 | Deguillaume ..... | H04N 1/32256 713/176 |
| 2011/0208577 A1 | 8/2011 | Lieblang et al. | |
| 2013/0125029 A1 | 5/2013 | Miller et al. | |
| 2013/0235412 A1* | 9/2013 | Baldwin ............... | G06F 3/1238 358/1.14 |
| 2013/0329243 A1 | 12/2013 | Pettis et al. | |
| 2014/0156053 A1* | 6/2014 | Mahdavi ............... | B29C 64/112 700/119 |
| 2014/0298486 A1 | 10/2014 | Robertson | |
| 2015/0039888 A1* | 2/2015 | Barrus ................ | G06F 21/6254 713/168 |
| 2015/0120806 A1* | 4/2015 | Lippincott ............. | H04L 63/08 709/203 |
| 2015/0132425 A1* | 5/2015 | Lacaze .................. | B33Y 50/00 425/150 |
| 2015/0134955 A1* | 5/2015 | Lacaze ................. | H04L 9/0877 713/168 |
| 2015/0205544 A1* | 7/2015 | Webb .................... | G06F 3/1285 358/1.15 |
| 2015/0220748 A1 | 8/2015 | Leach et al. | |
| 2015/0350278 A1* | 12/2015 | Isbjörnssund ......... | B29C 64/386 700/98 |
| 2016/0167305 A1* | 6/2016 | Pak ........................ | G06F 30/00 700/98 |
| 2016/0171354 A1 | 6/2016 | Glasgow et al. | |
| 2016/0180061 A1 | 6/2016 | Pogorelik et al. | |
| 2020/0014545 A1 | 1/2020 | Lacaze et al. | |

FOREIGN PATENT DOCUMENTS

| | | |
|---|---|---|
| CN | 105094720 A | 11/2015 |
| WO | 2011/055144 A2 | 5/2011 |
| WO | 2011/055144 A9 | 5/2012 |

* cited by examiner

INFORMATION PROCESSING DEVICE, INFORMATION PROCESSING METHOD, AND DISTRIBUTED COMPONENT

CROSS-REFERENCE TO RELATED APPLICATIONS

This is a continuation of U.S. application Ser. No. 17/220,939, filed Apr. 2, 2021, which is a continuation of U.S. application Ser. No. 16/075,311, filed Aug. 3, 2018 (now U.S. Pat. No. 10,997,305), which is a national stage (under 35 U.S.C. 371) of International Patent Application No. PCT/CN2017/072475, filed Jan. 24, 2017, claiming priority to Chinese Patent Application No. 201610079736.1, filed Feb. 4, 2016, the entire contents of each of which are incorporated herein by reference.

FIELD

The present disclosure generally relates to information processing, and in particular to an information processing apparatus, an information processing method and a distributed component which are related to three-dimensional printing.

BACKGROUND

A three-dimensional (3D) printer is a machine of accumulated manufacture technology, i.e., rapid forming technology. Based on a digital model file and by using adhesive material such as special wax, and powdered metal or plastic, the three dimensional printer manufactures a three dimensional object by printing the adhesive material layer by layer.

Modeling is an important step of the 3D printing. A model may be designed with, for example, computer-aided design (CAD), or an electronic model prototype may be directly generated by scanning an existing object and then corrected with auxiliary design software.

SUMMARY

A design process of a 3D model for 3D printing is a link needing an intellectual property protection. In other words, the property of a designed original work should be protected. Certain information security protection measures are needed for the designed work itself, a transmission link and a print link, to avoid the work from being copied maliciously, printed arbitrarily and the like. However, in a service of proving the 3D model remotely, files of the 3D model are uncontrollable once being downloaded to a local electronic device, and may be arbitrarily copied and printed.

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

An information processing apparatus is provided according to an embodiment. The information processing apparatus includes at least one processor. The processor is configured to generate a distributed component for a three dimensional printing task. The distributed component is configured to control execution of the three dimensional printing task independently of the information processing apparatus after establishing connection with a user equipment, and the distributed component contains decryption information with respect to three dimensional model data for the three dimensional printing task. The processor is further configured to control deployment of the distributed component to the user equipment.

An information processing method is provided according to an embodiment. The information processing method includes: generating a distributed component for a three dimensional printing task, where the distributed component is configured to control execution of the three dimensional printing task independently of an information processing apparatus after establishing connection with a user equipment, and the distributed component contains decryption information with respect to three dimensional model data for the three dimensional printing task; and controlling deployment of the distributed component to the user equipment.

An information processing apparatus is provided according to an embodiment. The information processing apparatus includes at least one processor. The processor is configured to control acquisition of a distributed component, deployed by a server end, for a three dimensional printing task. The distributed component is configured to control execution of the three dimensional printing task independently of a server after establishing connection with a user equipment, and the distributed component contains decryption information with respect to three dimensional model data for the three dimensional printing task. The processor is further configured to operate the distributed component to control a three dimensional printing apparatus associated with the information processing apparatus to execute the three dimensional printing task.

An information processing method is provided according to an embodiment. The method includes: controlling acquisition of a distributed component, deployed by a server end, for a three dimensional printing task, where the distributed component is configured to control execution of the three dimensional printing task independently of a server after establishing connection with a user equipment, and the distributed component contains decryption information with respect to three dimensional model data for the three dimensional printing task; and operating the distributed component to control a three dimensional printing apparatus associated with an information processing apparatus to execute the three dimensional printing task.

A computer-implemented distributed component is provided according to an embodiment. The computer-implemented distributed component is deployed from a server end to a user equipment for a three dimensional printing task. The distributed component includes: a control unit configured to control execution of the three dimensional printing task independently of a server after connection is established between the distributed component and the user equipment; and a carrying unit, configured to carry decryption information with respect to three dimensional model data for the three dimensional printing task.

With the apparatuses and methods according to the embodiments of the present disclosure, the 3D model data can be effectively protected and can be prevented from being arbitrarily copied and used.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Figure 1:
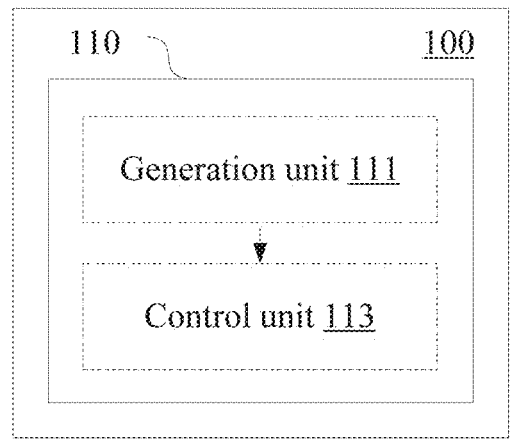
FIG. 1 is a block diagram showing a configuration example of an information processing apparatus according to an embodiment of the present disclosure.

Hereinafter embodiments of the present disclosure are described with reference to the drawings. Elements and features described in one drawing or one embodiment of the present disclosure may be combined with elements and features described in one or more other drawings or embodiments. It should be noted that, indication and description of components and processing which are not related to the present disclosure or well known for those skilled in the art are omitted in the drawings and illustrations for clearness.

As shown in FIG. 1, a wireless communication apparatus 100 according to an embodiment includes a processor 110. The processor 110 includes a generation unit 111 and a control unit 113. It should be noted that, although the generation unit 111 and the control unit 113 are shown as functional blocks in the drawing, it should be understood that functions of the generation unit 111 and the control unit 113 may be implemented by the processor 110 as a whole, and are not necessarily implemented by discrete actual components in the processor 110. In addition, although the processor 110 is shown by one block, the communication apparatus 100 may include multiple processors. The functions of the generation unit 111 and the control unit 113 may be distributed onto the multiple processors, and thus the multiple processors cooperate to perform the functions.

The generation unit 111 is configured to generate a distributed component for a three-dimensional printing task. The distributed component is configured to control execution of the three dimensional printing task independent of the information processing apparatus 100 after establishing connection with a user equipment, and the distributed component contains decryption information with respect to three dimensional model data for the three dimensional printing task.

The decryption information may be contained in the distributed component in multiple manners. For example, according to an embodiment, the generation unit 111 may be configured to embed a decryption key and a decryption algorithm for the three dimensional model data into execution codes of the distributed component in a white-box cryptography manner.

The control unit 113 is configured to control deployment of the distributed component to the user equipment.

Figure 11:
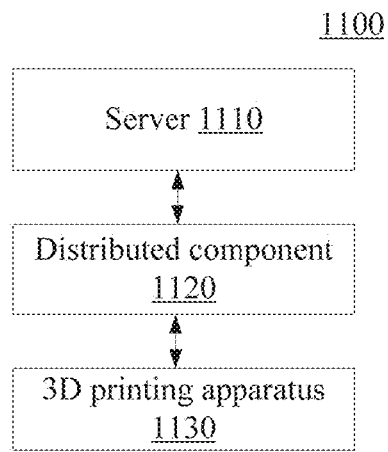
FIG. 11 is a block diagram showing an exemplary 3D printing system.

The information processing apparatus 100 according to the embodiment may be implemented as a server-end apparatus. For example, the information processing apparatus 100 may correspond to a server 1110 in an example shown in FIG. 11, alternatively, the information processing apparatus 100 may be deployed at the server end.

A hardware platform for implementing the information processing apparatus 100 at the server end may be a server cluster based on cloud calculation, a general-purpose server, or a home computer configured as a network server. For example, a server-end functionality may be provided to the external in a network service mode, such as website, or in a client/server (C/S) mode in which case the distributed component may be provided to the user equipment as client software.

The distributed component may be called as a dynamic proxy in some scenarios. When being deployed to the user equipment and operated by the user equipment, the distributed component as a control device implemented by the user equipment (such as a distributed component 1120 shown in FIG. 11) controls a three dimensional printing task executed by a three dimensional printing apparatus (such as a 3D printing apparatus 1130 shown in FIG. 11) associated with the user equipment. The user equipment may include various types of information processing apparatuses at a user end, for example, includes but is not limited to a personal computer (such as desktops and laptops), a smart phone, a tablet computer, a personal digital assistant (PDA) and the like. A configuration example of the distributed component is described in conjunction with embodiments hereinafter.

In order to better understand an implementation of the information processing apparatus according to the embodiment of the present disclosure, an example of a workflow between the server end, the user equipment end (distributed component) and the 3D printing apparatus end will be described in conjunction with FIG. 12. It should be understood that, the embodiment of the present disclosure may not include some processing of the following example, and the present disclosure is not limited to details shown in the following example.

Figure 12:
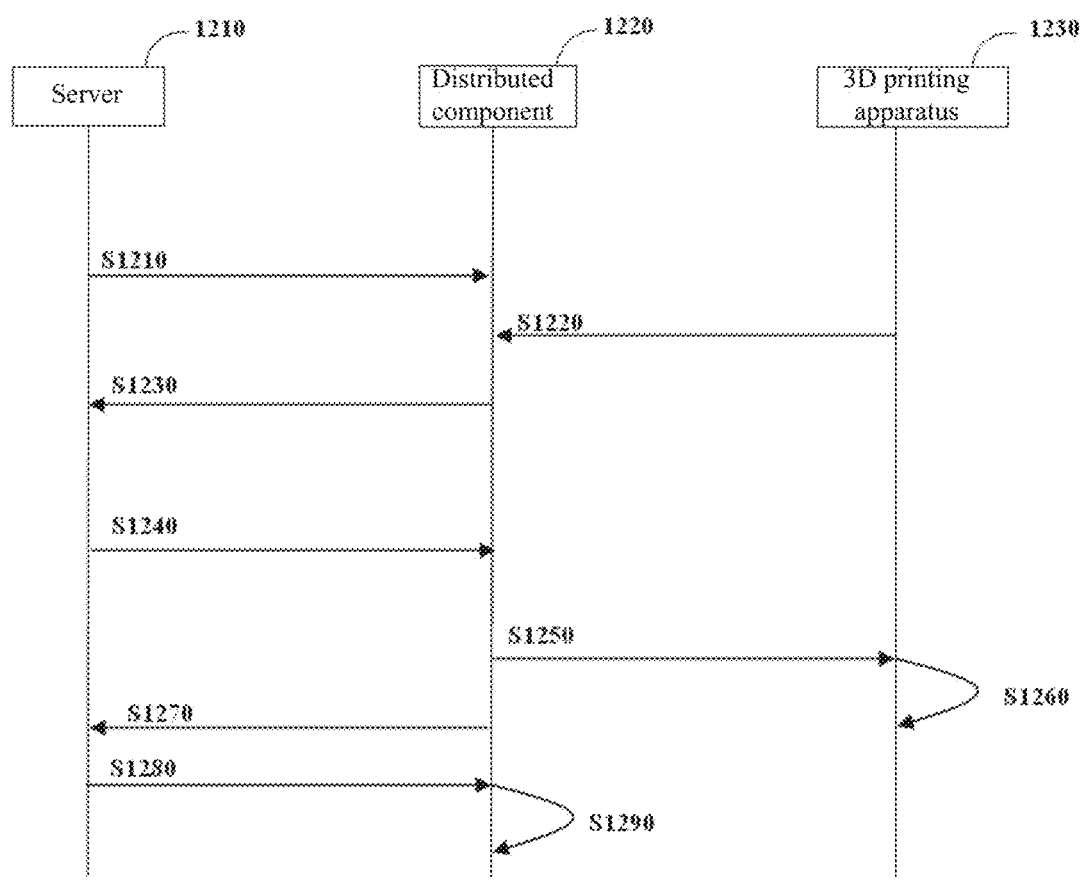
FIG. 12 is a schematic diagram showing an operation process example of an exemplary 3D printing system.

As shown in FIG. 12, in S1210, a server 1210 creates a distributed component and an encrypted print file based on a print authorization, and issues the distributed component to a user equipment. The user equipment provided with the distributed component is indicated by 1220.

In S1220, the distributed component 1220 detects a 3D printing apparatus 1230 connected to the user equipment end and may acquire apparatus information.

In S1230, the distributed component 1220 uploads the apparatus information to the server 1210.

In S1240, if necessary, the server 1210 may issue a driver, configuration parameters and the like to the distributed component 1220 based on the apparatus information. If the distributed component 1220 can directly process an encrypted file, then only an encrypted 3D model file or an encrypted slice file may be issued.

In S1250, the distributed component 1220 decrypts an encrypted print data file, and controls execution of a printing task. As described below in conjunction with embodiments, 3D print data may be sliced at the user equipment end, and a 3D printer is driven to complete the printing.

In S1260, a 3D printer completes a printing of a 3D model.

In S1270, the distributed component 1220 may feed printing information back to the server 1210, and the server 1210 may perform a corresponding record.

In S1280, the server 1210 initiates a clear instruction.

In S1290, the distributed component 1220 clears the print file and may complete a self-destruction.

Figure 18:
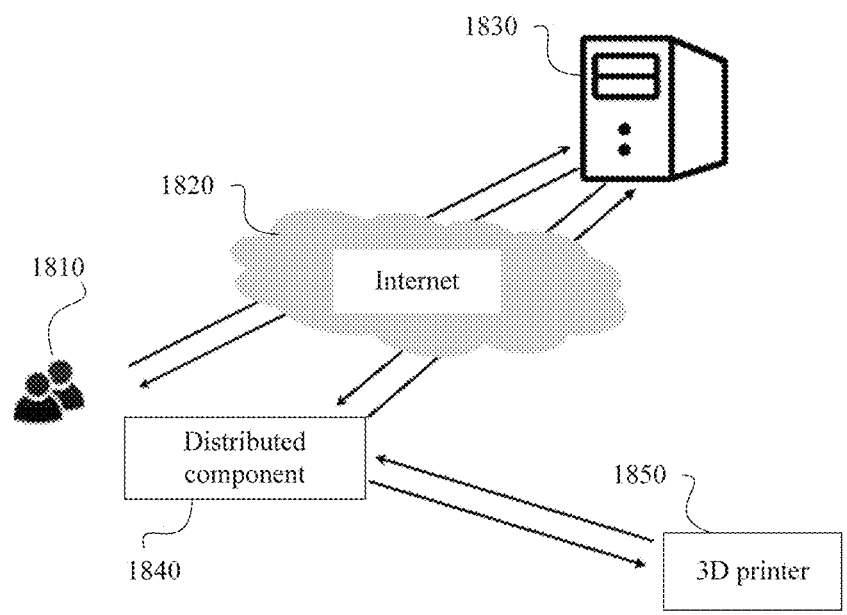
FIG. 18 is a schematic diagram illustrating a network-based application according to an embodiment of the present disclosure.
Figure 19:
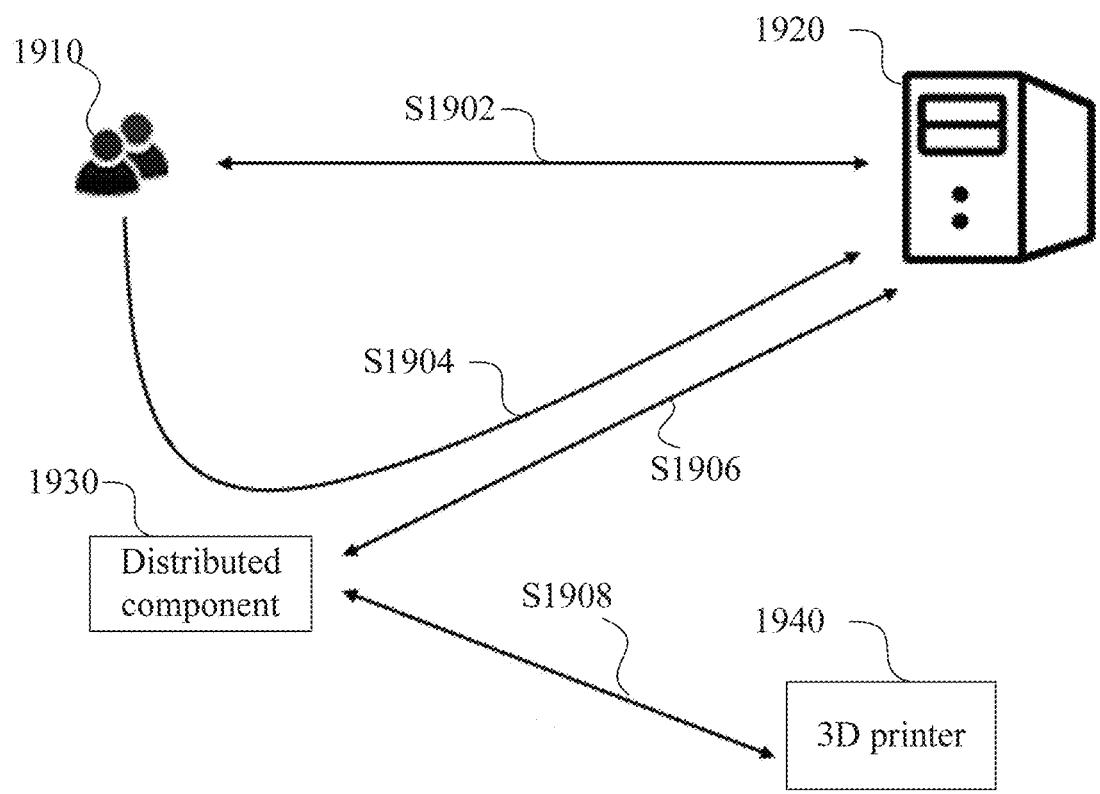
FIG. 19 is a schematic diagram illustrating a network-based application according to an embodiment of the present disclosure.
Figure 20:
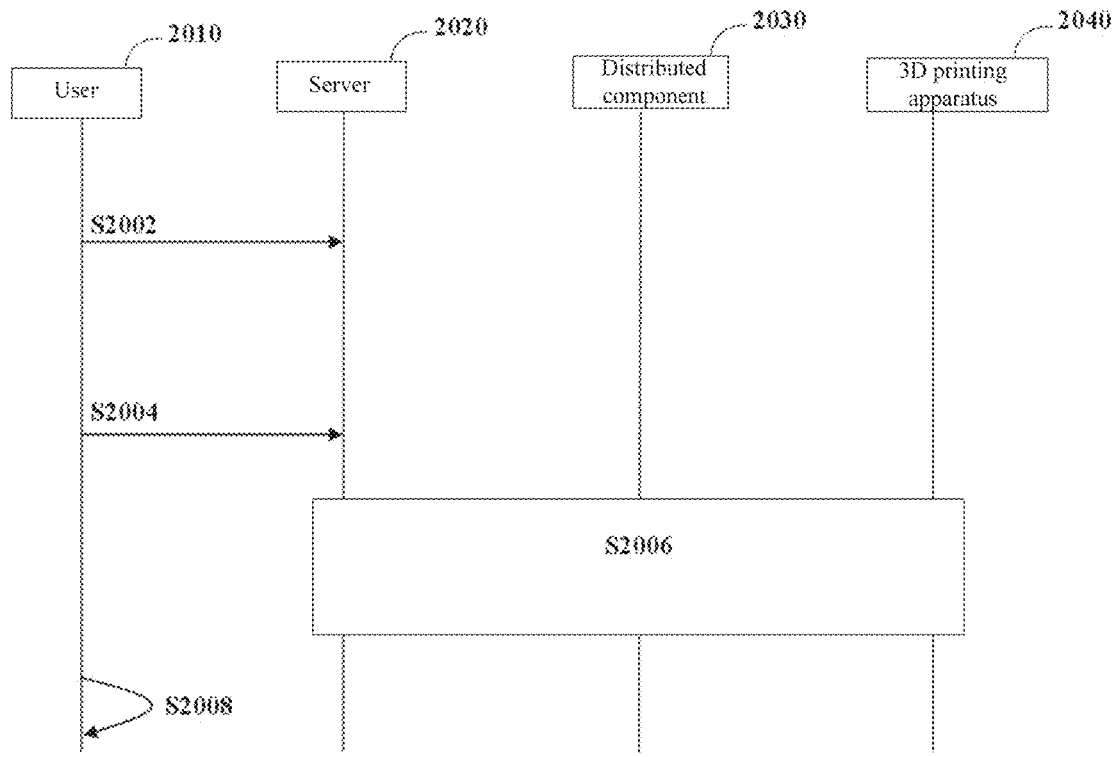
FIG. 20 is a schematic diagram illustrating a workflow in a network-based application according to an embodiment of the present disclosure.

In order to facilitate understanding an implementation of the embodiment of the present disclosure, FIG. 18 and FIG. 19 show examples of network-based application, and FIG. 20 shows an example of a workflow in a network-based application.

As shown in FIG. 18, a user 1810 accesses a server 1830 via a network such as the Internet 1820. The server 1830 distributes a distributed component 1840 via the network, and the distributed component 1840 controls a 3D printer 1850.

Referring to FIG. 19, in S1902, a user 1910 may acquire a print authorization credential or token from a server 1920.

In S1904, the user 1910 may login the server 1920 for a printing, and request to start the printing with the print authorization credential or token.

In S1906, the server 1920 may generate and issue a distributed component 1930 and transmit 3D model data.

In S1908, the distributed component 1930 controls a 3D printer 1940 to complete a 3D printing task.

FIG. 20 shows an example of a processing flow in an exemplary scenario where the information processing apparatus according to the embodiment of the present disclosure operates as a network 3D printing platform. It should be noted that, a hardware platform implementing the information processing apparatus may be a server cluster based on cloud calculation, a general-purpose server, a personal computer cluster or the like.

In S2002, a user 2010, such as an electronic device accessing the Internet via a personal computer, remotely connects to a server 2020 via a browser or an application.

In S2004, the user 2010 logins the server, browses and searches for a 3D model file having been stored in the server 2020, to find a 3D model to be printed and obtain a print authorization credential and a distributed component 2030. In addition, a transaction link may be contained in the above process if a paid service is involved. The user 2010 may operate the distributed component 2030 via an apparatus connected to a local 3D printer, to start up printing.

In S2006, for example, the process from S1220 to S1290 described in conjunction with FIG. 12 in the above may be performed.

In S2008, the user obtains the printed 3D models by consuming the print credential of the user. In addition, the server end may record and process accordingly.

It should be noted that the embodiment of the present disclosure is not limited to be serving as a network (such as, commercial) 3D printing platform, but may also serve as a personal 3D printing platform of the user.

In a case that the invention serves as the personal 3D printing platform of the user, the information processing apparatus according to the embodiment of the present disclosure may be implemented as a home computer configured as a server.

For example, the user may control a three dimensional printing task on a computer of the user in the following exemplary way.

The user opens software (or via the browser or application) to run a service function.

The user logins the software, browses and searches for a 3D model file having been stored in the computer, to find out a 3D model to be printed.

The user selects a printing function, and the system automatically allocates a print credential to the user. No transaction occurs in such exemplary scenario since the apparatus and the file are both private for the user. Server software generates a corresponding distributed component, and the distributed component is started to operate on a local machine (computer). Communication between the server software and the distributed component may be communication between different processes or communication between different threads. The distributed component obtains encrypted 3D model data from the server software, decrypts the encrypted 3D model data and drive a 3D printer to complete the printing.

After the printing is completed, the distributed component may clear caches, temporary files and the like on the local computer related to the printing task. Finally, the distributed component may accomplish a self-clearing.

Moreover, it may be also conceived a scenario where the user remotely connects the computer of the user to complete the 3D printing. Specifically, the user may use at offsite a computer or other electronic devices connected to the Internet, remotely connect a self-designed web server (personal computer) via a browser or an application, and finds out a 3D model to be printed, and further complete a 3D printing task with the distributed component with a similar process.

In addition, the following exemplary application scenarios may be further conceived. If the user has no available local 3D printer, the user may choose to print with other online and available 3D printers provided at the server end. After the printing is completed, the printed 3D model may be transferred to the user in an express delivery or post manner.

The distributed component obtained by the user is electronic information which can be copied and transferred. When operating for printing, the distributed component may automatically connect to a remote server to complete print authorization verification and perform the printing.

It should be understood that, the embodiment of the present disclosure is not limited to the details of the above examples.

According to the embodiment of the present disclosure, the execution of the three dimensional printing task is controlled by the distributed component, and the distributed component carries decryption information with respect to 3D model data for the three dimensional printing task. The 3D model data can be effectively protected since the 3D model data is securely transmitted from the server end to the user equipment end by using the distributed component.

Figure 2:
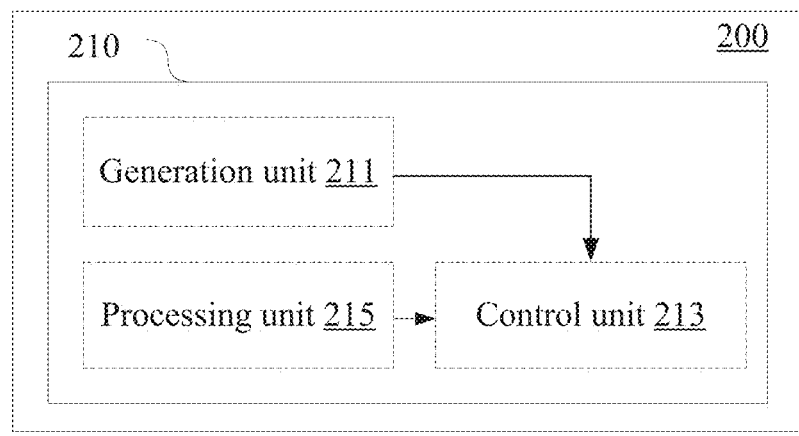
FIG. 2 is a block diagram showing a configuration example of an information processing apparatus according to another embodiment.

Next, a configuration example of an information processing apparatus according to an embodiment of the present disclosure is described by referring to FIG. 2. Similar to the above embodiment, the information processing apparatus according to the embodiment also corresponds to the server end.

As shown in FIG. 2, the information processing apparatus according to the embodiment includes a processor 210. The processor 210 includes a generation unit 211, a control unit 213 and a processing unit 215. The generation unit 211 has a similar configuration to the generation unit 111 described with reference to FIG. 1, the details of the generation unit 211 are not repeated here.

The processing unit 215 is configured to process three dimensional model data for a three dimensional printing task. In addition to control deployment of a distributed component generated by the generation unit 211 to the user equipment, the control unit 213 is further configured to control transmission of the three dimensional model data processed by the processing unit 215 to the user equipment.

According to an embodiment, the three dimensional model data includes primary model data and secondary model data, and the generation unit 211 may be configured to arrange the secondary model data into the generated distributed component uniquely. Accordingly, the processing unit 215 may be configured to process the three dimensional model data to be transmitted to the user equipment to be the primary model data.

In other words, according to the embodiment, the distributed component may carry a portion of 3D model data by itself, and the 3D model data issued to the user equipment end is incomplete and needs to be supplemented by the distributed component to form actually available 3D model data. With the configuration, the 3D model data can be further protected from arbitrary copy and utilization.

In addition, the process on the three dimensional model data performed by the processing unit 215 is not limited to this. For example, according to an embodiment, the processing unit 215 may be configured to encrypt the three dimensional model data or slice data obtained from the three dimensional model data, and/or perform a fragmentization process and an obfuscation process on the three dimensional model data or the slice data. Accordingly, the generated distributed component may further contain a recovery algorithm corresponding to the obfuscation process in the case that the obfuscation process is performed on the three dimensional model data.

Generally, the 3D model data needs to be processed into slice data for printing. For example, the 3D model source code file format for example includes STL and AMF, and the slice file generated in a pre-processing before the printing is generally a Gcode file, which is a set of printing instructions. Taking the STL model file as an example, the slicing process needs to be performed based on parameters of a 3D printer, such as temperature, speed, filling rate and thickness, to convert the file into Gcode codes (G codes are for controlling the printing of the 3D printer) run by a control apparatus.

According to the embodiment of the present disclosure, the slice data may be generated at the server end or may be generated by the distributed component at the user equipment end. Next, exemplary embodiments under these two cases are respectively described.

According to an embodiment, the distributed component generated and arranged to the user equipment by the information processing apparatus 200 is configured to acquire a parameter of a three dimensional printing apparatus associated with the user equipment, and control transmission of the parameter to the information processing apparatus 200. Accordingly, the processing unit 215 may be further configured to process the three dimensional model data into slice data based on the parameter. In addition, the generation unit 211 may be further configured to generate printing configuration information based on the parameter. Moreover, the control unit 213 may be configured to control transmission of the slice data obtained by the processing unit 215 and the printing configuration information generated by the generation unit 211 to the distributed component at the user equipment to control the execution of the three dimensional printing task. In the embodiment, the slice data is generated at the server end, and the parameter of the 3D printing apparatus is provided to the server end by the distributed component for generating the slice data.

According to an embodiment, the slice data is generated by the distributed component at the user equipment end. Accordingly, the generated distributed component which is deployed to the user equipment is configured to acquire a parameter of a three dimensional printing apparatus associated with the user equipment, and process three dimensional model data into slice data based on the acquired parameter.

Besides, in some applications, the user can print the 3D model only if the user obtains an authorization. In this case, the authorization information may be carried by the distributed component. According to an embodiment, the generated distributed component may contain authorization information related to three dimensional model data for a three dimensional printing task, and the distributed component may be configured to control the execution of the three dimensional printing task based on the authorization information. The authorization information may include, for example, an identifier of the three dimensional model data, an allowable number of times for printing the three dimensional model data and a usage time limit of the three dimensional model data. With the configuration, an arbitrary utilization of a three dimensional model to be protected can be effectively prevented.

In addition, according to an embodiment, the generated distributed component may be configured to clear a model file, a slice file, a temporary file and/or cache data for a three dimensional printing task, during the execution of or after completion of the three dimensional printing task. With the configuration, a malicious copy of the three dimensional model data can be effectively prevented.

As aforementioned, the information processing apparatus according to the above embodiment may be implemented as a server. For example, the information processing apparatus according to the embodiment of the present disclosure may operate as a three dimensional model browsing server or a three dimensional printing control server. In addition, the three dimensional model browsing server may include a three dimensional model library and/or a three dimensional model transaction interface.

Figure 16:
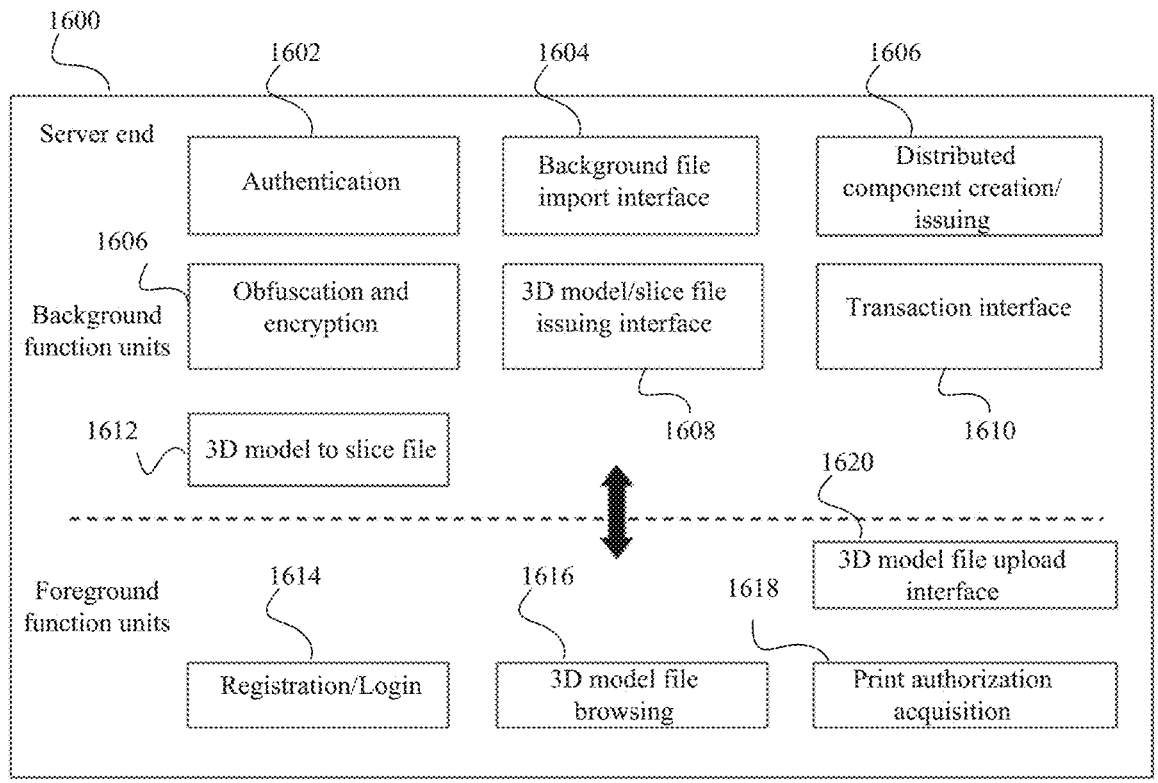
FIG. 16 is a schematic diagram showing a functional structure of an information processing apparatus at a server end.

FIG. 16 shows a configuration example of an information processing apparatus implemented as a server. It should be noted that, modules shown in FIG. 16 only show function units that may be contained in a server in an example manner, and it is unnecessary for the information processing apparatus according to the embodiment of the present disclosure to contain all of the shown function units. In addition, the shown function units may be respectively implemented as single web pages, or may be combined into one or more web pages.

As shown in FIG. 16, the function units contained in the server end for example may be divided into foreground function units, i.e., user interface (UI), and background function units.

The foreground function units may include a registration/login unit 1614, a 3D model file browsing unit 1616, a print authorization acquisition unit 1618 and a 3D model file upload interface unit 1620.

The registration/login unit 1614 is configured to accept a registration from a new user, and is used for a registered user to login the system. The function unit may interact with an authentication unit 1602 of the background service function.

With the 3D model file browsing unit 1616, a user may browse and select a 3D model having been imported into the server end.

In a case that a user selects a certain 3D model and wants to print the 3D model, the user firstly needs to obtain a print authorization with the print authorization acquisition unit 1618. The authorization may be bound into the distributed component in an electronic data manner.

The 3D model file upload interface unit 1620 serves as an interface for the user to import 3D design of the user into the server end.

The background function units may include an authentication unit 1602, a background file import interface unit 1604, an obfuscation and encryption unit 1606, a 3D model to slice file unit 1612, a 3D model/slice file issue interface unit 1608, a transaction interface unit 1610 and a distributed component creation/issue unit 1606.

The authentication unit 1602 is used for a user to login for an authentication.

For the background file import interface unit 1604, in the case that a cloud service or a general-purpose server at the server end provides service to the external, a large quantity of 3D model files needs to be imported irregularly, the 3D model files may be imported with the background function interface in batches instead of being imported via the foreground upload interface one by one.

The obfuscation and encryption unit 1606 is configured to perform operations such as fragmentization, obfuscation and encryption on a 3D data file to be issued.

The 3D model to slice file unit 1612 is configured to convert a 3D model file (such as STL and AMF) to be in a slice file format supported by the distributed component.

For the 3D model/slice file issue interface unit 1608, if the distributed component contains an effective print authorization, then a 3D model file to be printed or a pre-processed slice file is downloaded via the issue interface, the file may be transmitted in the network in a ciphertext form.

If the server end is a business service platform, then transaction may occur during a process that the user acquires a print authorization. In this case, the transaction interface unit 1610 is configured to complete a transaction engagement for the two parties.

For the distributed component creation/issuing unit 1606, a distributed component is generated at the server end in the case that the user obtains the print authorization, in response to a print request of the user. The distributed component may be bound with the print authorization obtained by the user. The distributed component is issued to a local apparatus of the user connected to a local 3D printer to complete printing of the 3D model. If the user has no local 3D printer, the printing may also be completed by connecting available 3D printing apparatus nearby via the server.

Besides, in addition to the aforementioned authentication process on user, an authentication process on 3D printing apparatus may be needed in some applications. In this case, only a specified 3D printing apparatus can be allowed to perform a specified 3D printing task.

The authentication process on 3D printing apparatus may be performed by the distributed component. According to an embodiment, the distributed component generated by the information processing apparatus (such as a server) is configured to transfer authentication information between the information processing apparatus and the three dimensional printing apparatus, for mutual authentication between the information processing apparatus and the three dimensional printing apparatus.

Based on different authentication methods, the authentication information for example may include a certificate and signature information for a certificate mode, encryption random information or signature information for an identity public key system mode, or challenge information, identification information, and auxiliary information for a prefabrication shared key mode.

Next, the authentication process on the 3D printing apparatus is described with examples.

A 3D printing apparatus may have an apparatus identity key, which for example may be prefabricated in the apparatus at factory, or may be issued and written into the apparatus online by a third party mechanism. The apparatus key may be based on certificate authority (CA) digital certificate, may be issued by a key generation center (KGC)

of an identity-based encryption system (IBE), or may be a key available to identity authentication supported by other cryptographic algorithms.

The information processing apparatus (such as the server) may also have an identity key, and may authorize the distributed component and the 3D printing apparatus to perform a bidirectional identity authentication. Specifically, the bidirectional authentication may be performed in following exemplary manners.

In manner 1, the distributed component is embedded with signature information based on an identity key of the information processing apparatus in the generation of the distributed component, and the distributed component completes the bidirectional authentication with the 3D printing apparatus with the signature information.

In manner 2, in the generation of the distributed component, the information processing apparatus gives the distributed component a right of proxy signature, and the distributed component representing the information processing apparatus completes the bidirectional authentication with the 3D printing apparatus.

In manner 3, the distributed component may also serve as an intermediate party for supporting the bidirectional authentication between the 3D printing apparatus and the information processing apparatus.

Besides, after performing the bidirectional identity authentication, the distributed component and the 3D printing apparatus may perform a key negotiation based on identity key information or authentication information to determine a communication key. After the communication key is determined, data is transmitted between the distributed component and the 3D printing apparatus by being encrypted with the communication key, thereby ensuring the security of the data from the distributed component to the 3D printing apparatus.

Figure 22:
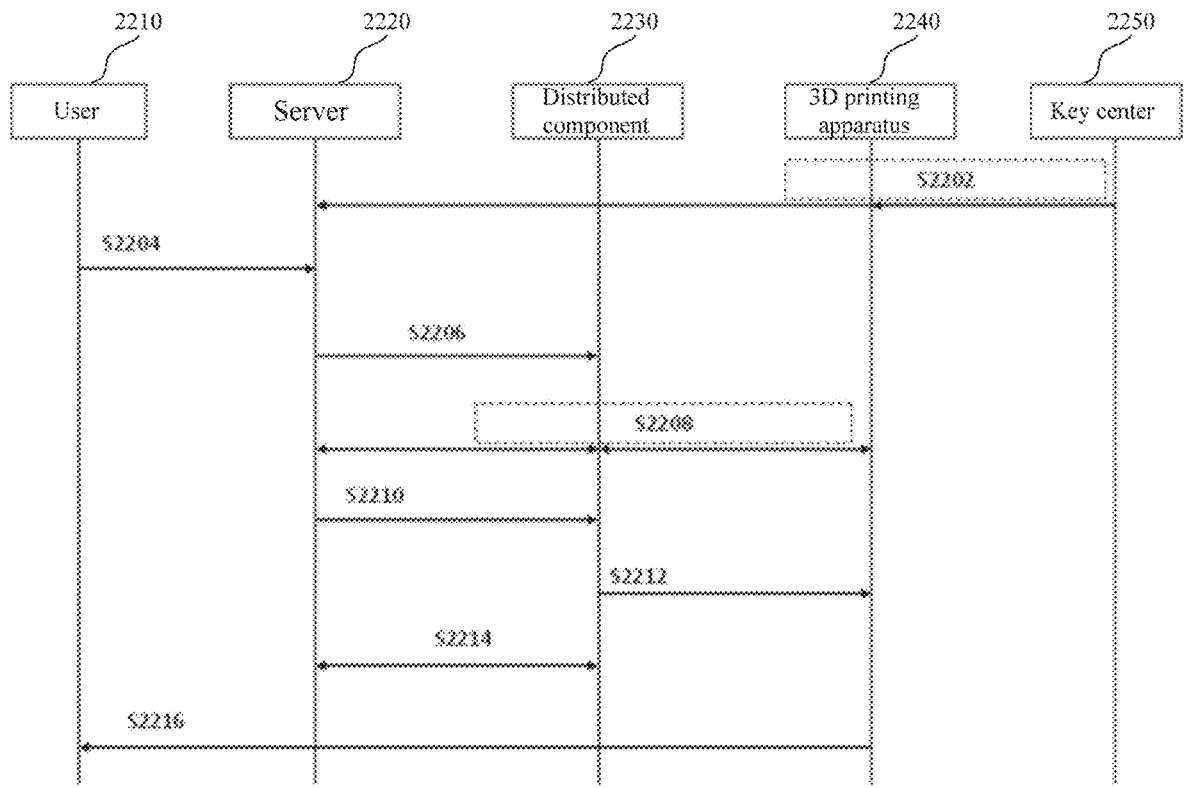
FIG. 22 is a schematic diagram showing a system workflow containing an authentication process for a 3D printing apparatus.

FIG. 22 shows an example of a workflow of a system containing the above authentication process.

In S2202, the apparatus identity key is initialized. In the example, a key center 2250 provides the key to a server 2220 and a 3D printing apparatus 2240.

In S2204, a user 2210 acquires a print authorization from the server 2220 to start printing.

In S2206, the server 2220 generates a distributed component 2230 and issues the distributed component 2230 to a client apparatus.

In S2208, the distributed component 2230 and a 3D printing apparatus 2240 perform a mutual authentication.

In S2210, 3D model data is securely issued from the server 2220 to the distributed component (user equipment end) 2230.

In S2212, the distributed component 2230 controls the 3D printing apparatus 2240 to execute the printing task.

In S2214, after the printing task is completed, the printing data and the distributed component 2230 are cleared.

In S2216, the user 2210 obtains a printed model.

Figure 23:
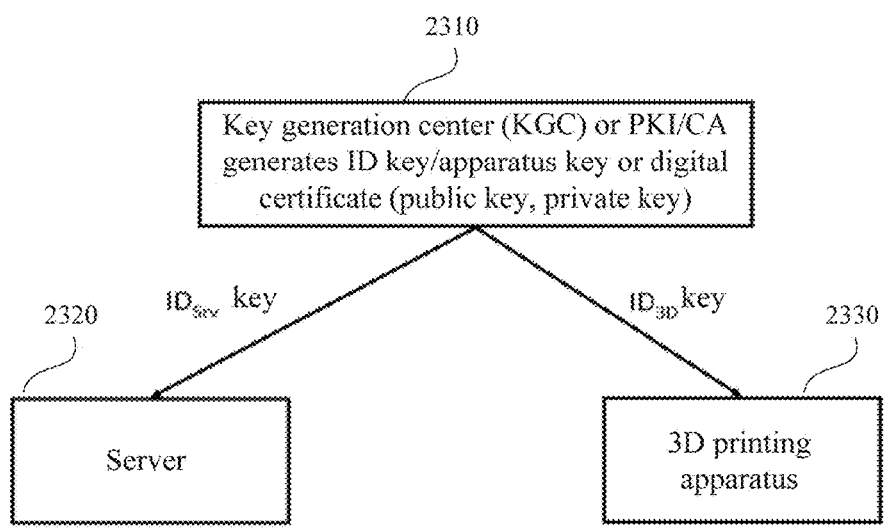
FIG. 23 is a schematic diagram illustrating an authentication process for a 3D printing apparatus.

FIG. 23 is a schematic diagram for generally illustrating an initialization phase of the mutual authentication between a distributed component and a 3D printing apparatus. As shown in the drawing, a key generation center or public key infrastructure/certificate authority (PKI/CA) 2310 generates an identity key/apparatus key or digital certificate (public key or private key), and issues the generated identity key/apparatus key or digital certificate to a server 2320 and a 3D printing apparatus 2330.

The identity key for example may be distributed in the initialization phase in the following key management modes: a certificate (PKI/CA)-based mode; an identity public key system (IBE)-based mode; and an apparatus prefabrication shared key (PSK)-based mode.

Hereinafter, the mutual authentication process between the distributed component and the 3D printer according to the embodiment of the present disclosure is described respectively based on these three exemplary key management modes.

Figure 24:
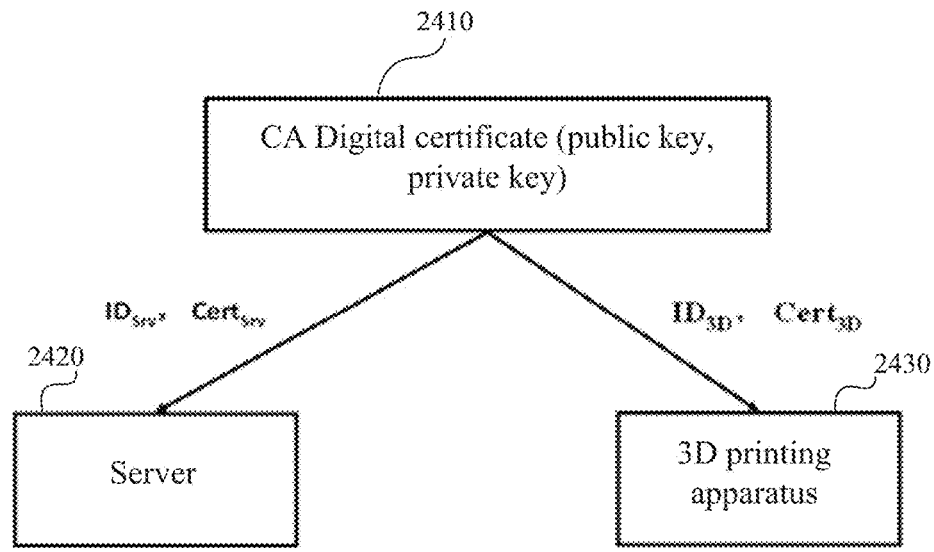
FIG. 24 is a schematic diagram illustrating a first exemplary authentication process for a 3D printing apparatus.

In the certificate-based mode, as shown in FIG. 24, a certificate authority (CA) 2410 issues a digital certificate to a server 2420 and a 3D printing apparatus 2430 in the initialization phase. During the authentication, CA 2410 as a trusted third party is configured to verify the validity of the certificate.

Figure 25:
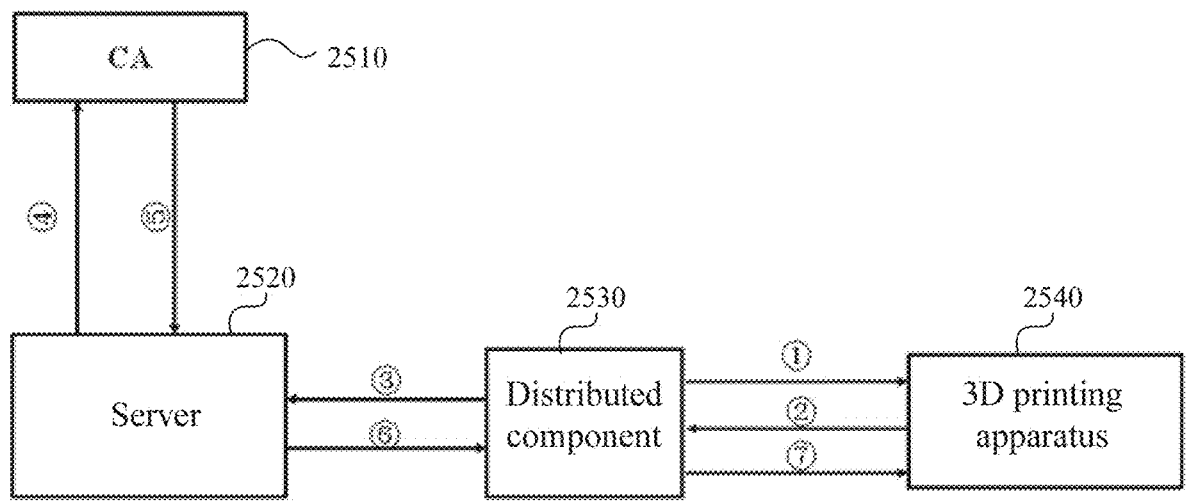
FIG. 25 is a schematic diagram illustrating a workflow of a first exemplary authentication process.

FIG. 25 shows an example of a workflow in the certificate-based mode.

① a distributed component 2530 connects to a 3D printing apparatus 2540 to initiate an authentication.

② the 3D printing apparatus 2540 sends both signature information and a certificate to the distributed component 2530.

③ the distributed component 2530 forwards the certificate and the signature information of the 3D printing apparatus 2540 to a server 2520.

④ the server 2520 sends a certificate of the server 2520 and the certificate of the 3D printing apparatus 2540 together to a CA 2510 for certificate verification, and the CA 2510 verifies the validities of the certificates of both the server 2520 and the 3D printing apparatus 2540.

⑤ the CA 2510 returns correct response information after the verification.

⑥ if the certificate of the 3D printing apparatus is valid, the server 2520 sends the verification result of verifying the certificate of the server by the CA 2510 to the distributed component 2530.

⑦ the distributed component 2530 returns the verification result of verifying the certificate of the server by the CA 2510 to the 3D printing apparatus 2540, and the verification is completed.

In the case that the identity authentication is successful, the distributed component 2530 may perform a key negotiation with the 3D printing apparatus 2540. Then, data to be communicated between the distributed component 2530 and the 3D printing apparatus 2540 is encrypted with the negotiated key.

Figure 26:
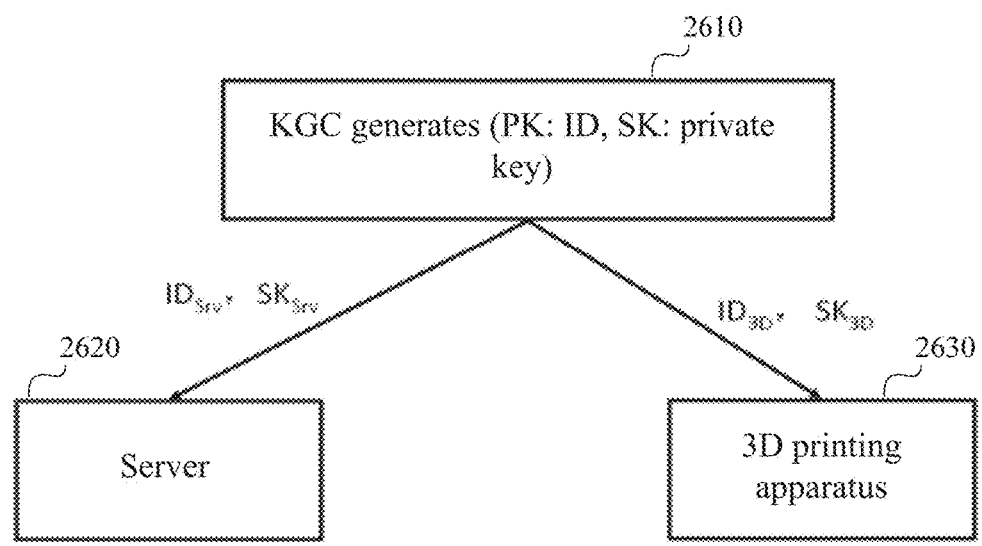
FIG. 26 is a schematic diagram illustrating a second exemplary authentication process for the 3D printing apparatus.

In the identity public key system-based mode, as shown in FIG. 26, a key generation center (KGC) 2610 generates a key pair (PK=ID, SK) based on an identity ID of a server 2620 and an identity ID of a 3D printing apparatus 2630 in the initialization phase. The key pair is bound with the IDs. In an identity public key system, ID may serve as a public key PK, such as identity number and email address.

The identity public key system is simplified as compared with the certificate-based authentication, since a private key is bound with an identity and no certificate is needed. Hence, a relationship between the identity and the key is verified via a third party trusted platform.

Figure 27:
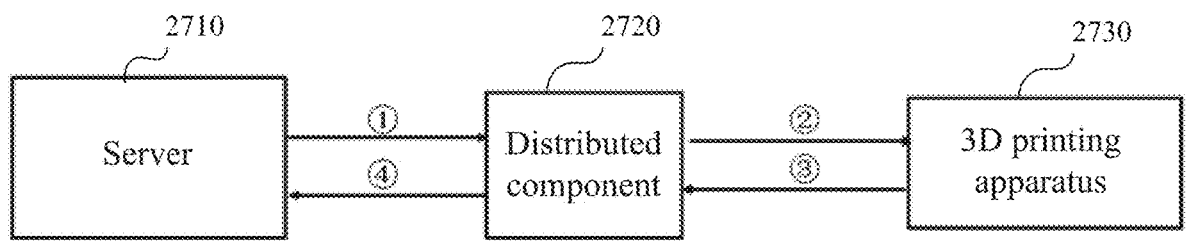
FIG. 27 is a schematic diagram illustrating a workflow of the second exemplary authentication process.

FIG. 27 shows an example of a workflow in the mode.

① a server 2710 encrypts random information with an identity public key $ID_{3D}$ of 3D printing, and sends the encrypted information to a distributed component 2720 via a secure channel.

② the distributed component 2720 forwards the encrypted random information to a 3D printing apparatus 2730, and the 3D printing apparatus 2730 decrypts the obtained random information with an identity private key $SK_{3D}$.

③ the 3D printing apparatus 2730 encrypts the random information with an identity public key IDs, of the server 2710 and returns the encrypted information to the distributed component 2720.

④ the distributed component 2720 returns the encrypted random information to the server 2710 via the secure channel. The server 2710 decrypts the obtained random information with an identity private key $SK_{Srv}$. If the decrypted random information is the same as the random information before, then the identity authentication is successful.

The random information may serve as a communication encryption key. For example, the server 2710 sends random information to the distributed component 2720 via the secure channel, and data transmission between the distributed component 2720 and the 3D printing apparatus 2730 is encrypted with the random information.

Of course, in view of secure communication, in the above process flow, a signature of the sender for communication information may be added, and a receiver can determine a real identity of an actual sender. That is, the encrypted random information is sent together with a digital signature for the information. The digital signature is obtained by the sender based on an identity private key of the sender and a signature algorithm. By adding the signature, an attack from an intermediate party, that is, a listener is arranged between the distributed component and the 3D printing apparatus to forge communication contents, can be effectively resisted.

On the other hand, in the case that the random information is not used as a decryption key, after the identity authentication is successful, the distributed component 2720 may perform a key negotiation with the 3D printing apparatus 2730, and data in the communication between the distributed component 2720 and the 3D printing apparatus 2730 is encrypted with the negotiated key.

Figure 28:
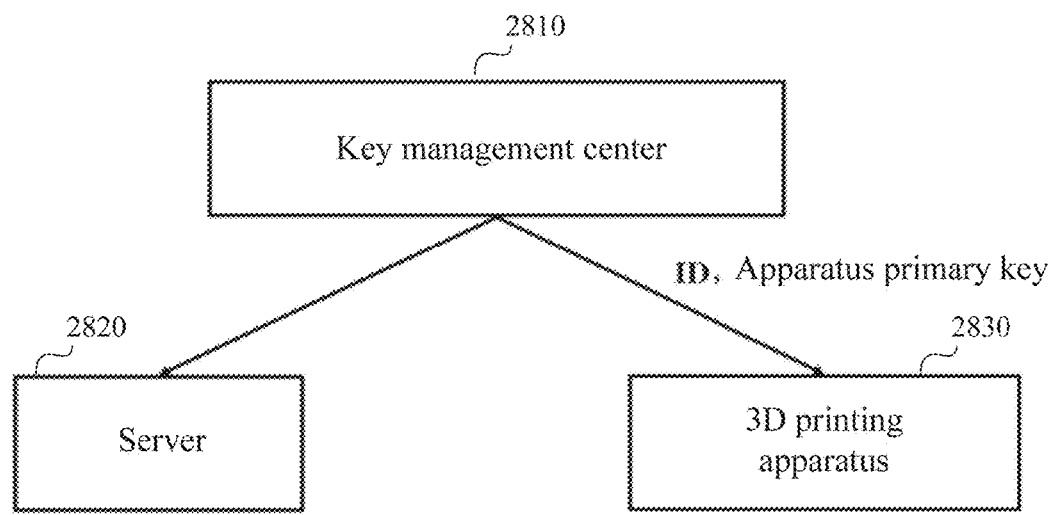
FIG. 28 is a schematic diagram illustrating a third exemplary authentication process for the 3D printing apparatus.

In the apparatus prefabrication shared key-based mode, as shown in FIG. 28, a key management center 2810 is configured to generate an apparatus primary key in the initialization phase. The key may be imported to a 3D printing apparatus 2830 by an apparatus fabricator or in an online manner. The primary key is the unique identity key of the 3D printing apparatus.

In communication, the server 2820 acquires a communication encryption key EK deduced based on the apparatus primary key, based on $ID_{3D}$ and other auxiliary information via the key management center 2810.

Figure 29:
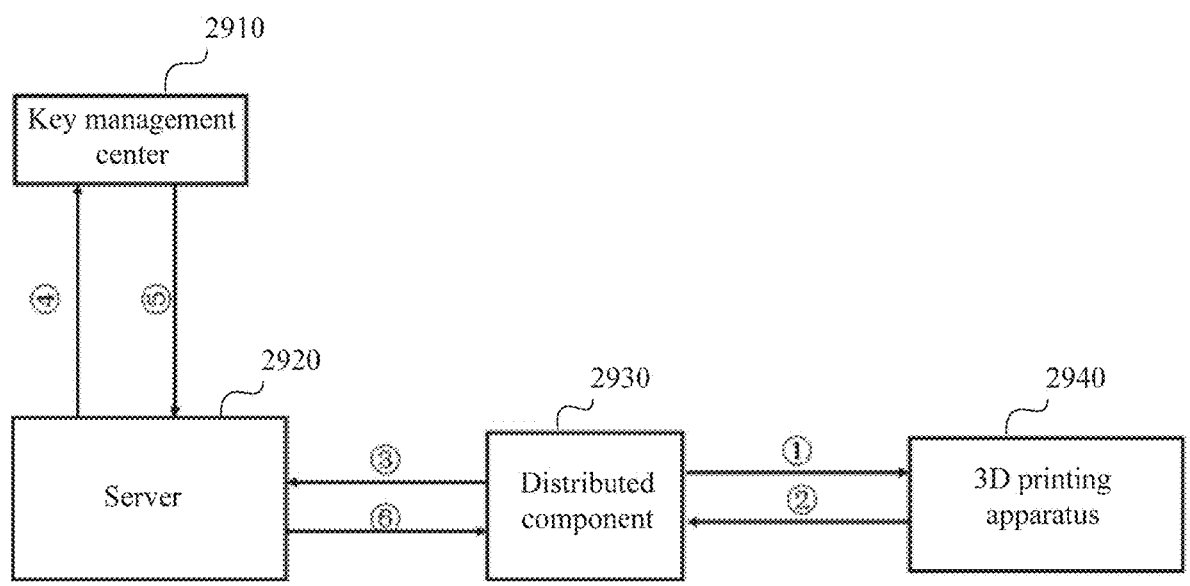
FIG. 29 is a schematic diagram illustrating a workflow of the third exemplary authentication process.

FIG. 29 shows an example of a workflow in the mode.

① a distributed component 2930 connects a 3D printing apparatus 2940 and sends challenge information to the 3D printing apparatus 2940.

② the 3D printing apparatus 2940 sends ID 3D information and other auxiliary information to the distributed component 2930. Meanwhile, the 3D printing apparatus 2940 deduces an encryption key EK based on its apparatus primary key, received challenge information and auxiliary information sent by itself, by using a preset specified algorithm.

③ the distributed component 2930 forwards the challenge information, $ID_{3D}$ information and other auxiliary information to a server 2920.

④ the server 2920 sends the challenge information, $ID_{3D}$ information and other auxiliary information to a key management center 2910 via a secure channel, to request an encryption key for communication with the 3D printing apparatus 2940.

⑤ the key management center 2910 deduces an encryption key EK based on a prestored apparatus primary key corresponding to $ID_{3D}$, and received challenge information, $ID_{3D}$ information and other auxiliary information, by using a specified algorithm, and returns the EK to the server 2920 via the secure channel.

⑥ the server 2920 securely issues the EK to the distributed component 2930. In this case, the EK can be used by the distributed component 2930 and the 3D print apparatus 2940.

It should be noted that, the mutual authentication in the embodiment of the present disclosure is not limited to the details in the above examples.

Figure 21:
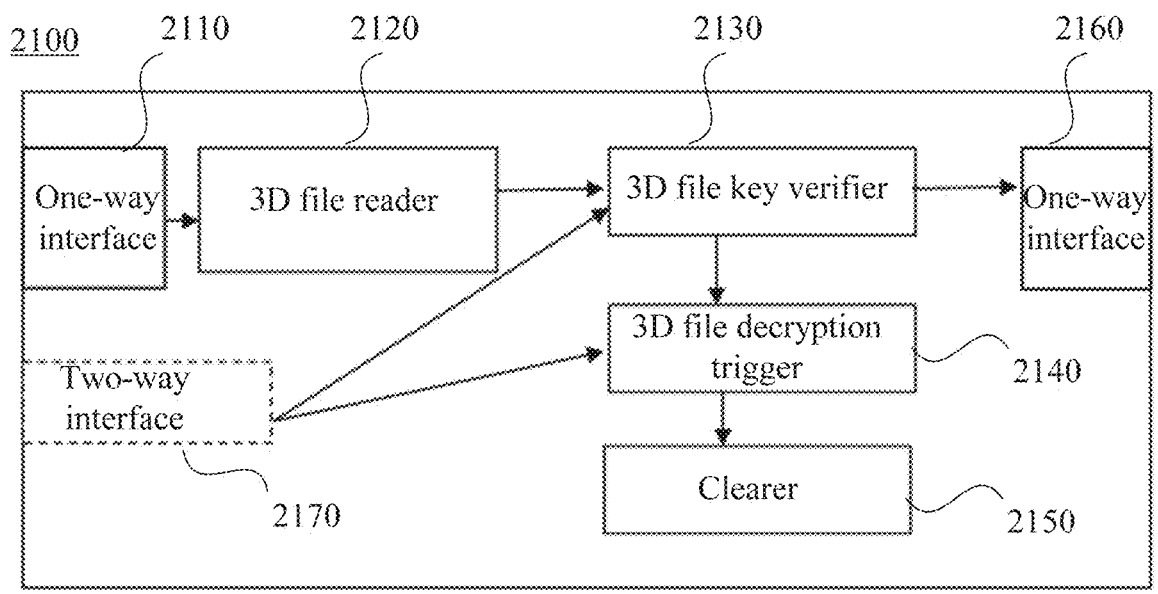
FIG. 21 is a schematic diagram showing an exemplary structure of an exemplary distributed component.

FIG. 21 shows an example of a structure of a distributed component. In the example, a distributed component 2100 includes one-way interfaces 2110 and 2160, a 3D file reader 2120, a 3D file key verifier 2130, a 3D file decryption trigger 2140 and a clearer 2150. The one-way interface 2110 is configured to receive a 3D file. The 3D file reader 2120 is configured to read (and not store) the 3D file. The 3D file key verifier 2130 is configured to perform verification operations related to print authorization. The 3D file decryption trigger 2140 is configured to trigger to decrypt the 3D file. The clearer 2150 is configured to clear process data during the execution of or after completion of the printing, and can delete the distributed component itself after the printing. The one-way interface 2160 is configured to output a print instruction to the 3D printing apparatus. Optionally, the distributed component 2100 may further include a two-way interface 2170. The two-way interface 2170 is configured to, for example, connect the 3D file key verifier 2130 in an administrator mode to update the key, and connect the 3D file decryption trigger 2140 in a certain case for automatic clearing and unlock. The automatic clearing and unlock indicates that, in some cases, the distributed component can be unlocked and reused, or, the distributed component can be used in another printing task period by only updating the key portion. For example, a user bought a same 3D model fractionatedly in a 3D printing sequence, or a user has a print authorization of printing a certain 3D model for unlimited times.

In the above description of the information processing apparatus at the server end according to the embodiment of the present disclosure, some processes and methods are disclosed apparently. Subsequently, an information processing method at the server end according to an embodiment of the present disclosure is described without repeating the details described above.

Figure 3:
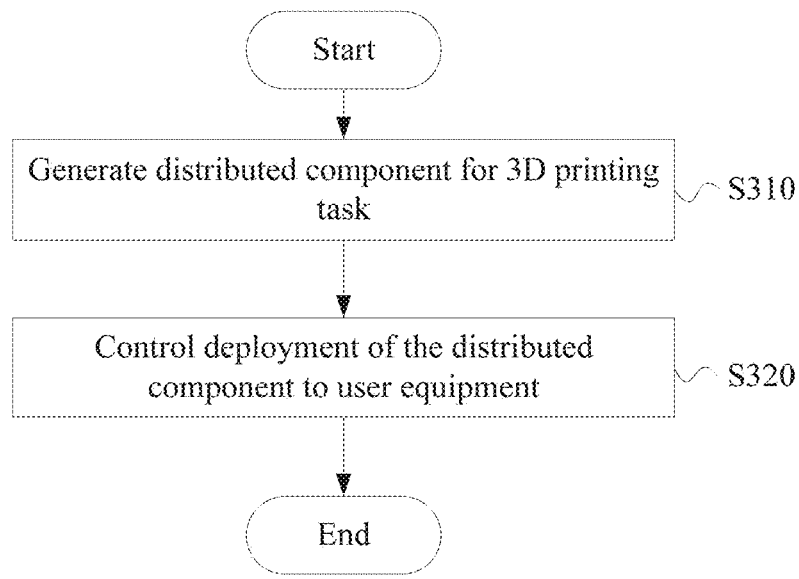
FIG. 3 is a flowchart showing a process example of an information processing method according to an embodiment of the present disclosure.

As shown in FIG. 3, an information processing method according to an embodiment includes steps.

In step S310, a distributed component for a three dimensional printing task is generated. The distributed component is configured to control execution of the three dimensional printing task independently of an information processing apparatus after establishing connection with a user equipment, and the distributed component contains decryption information with respect to three dimensional model data for the three dimensional printing task.

In step S320, the distributed component is controlled to be deployed to the user equipment.

The information processing method according to an embodiment further includes process on the three dimensional model data.

Figure 4:
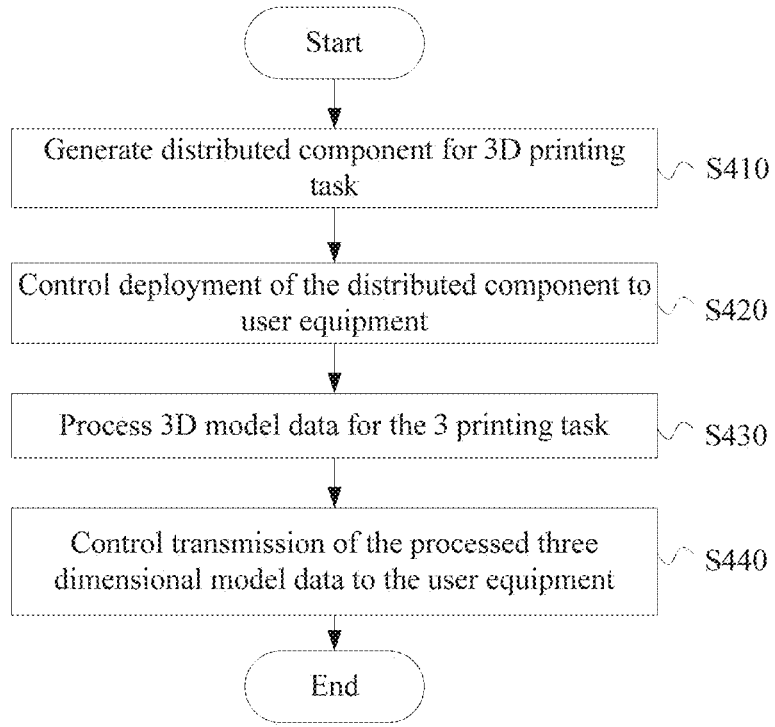
FIG. 4 is a flowchart showing a process example of an information processing method according to another embodiment.

As shown in FIG. 4, an information processing method according to an embodiment includes following steps.

In step S410, a distributed component for a three dimensional printing task is generated.

In step S420, the distributed component is controlled to be deployed to the user equipment.

In step S430, three dimensional model data for the three dimensional printing task is processed.

In step S440, the processed three dimensional model data is controlled to be transmitted to the user equipment.

In the above, embodiments of the information processing apparatus and information processing method at the server end are described. The embodiments of the present disclosure further include information processing apparatus and information processing method at a user equipment end.

Figure 5:
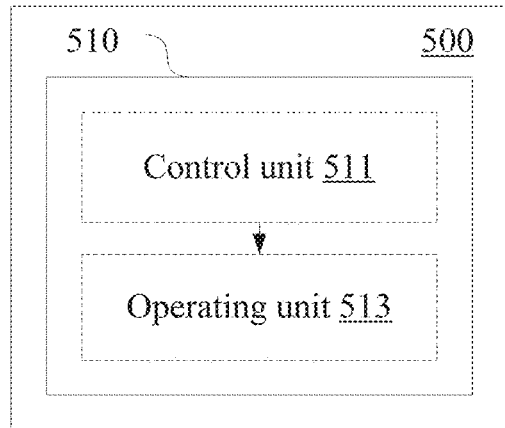
FIG. 5 is a block diagram showing a configuration example of an information processing apparatus according to an embodiment of the present disclosure.

As shown in FIG. 5, an information processing apparatus 500 according to an embodiment includes at least one processor 510. The processor 510 includes a control unit 511 and an operating unit 513.

The control unit 511 is configured to control acquisition of a distributed component, deployed by a server end, for a three dimensional printing task. The distributed component is configured to control execution of the three dimensional printing task independent of a server after establishing connection with the user equipment, and the distributed component contains decryption information with respect to three dimensional model data for the three dimensional printing task.

The operating unit 513 is configured to operate the received distributed component to control a three dimensional printing apparatus associated with the information processing apparatus 500 to execute the three dimensional printing task.

According to an embodiment, the information processing apparatus 500 operates as the user equipment.

Figure 6:
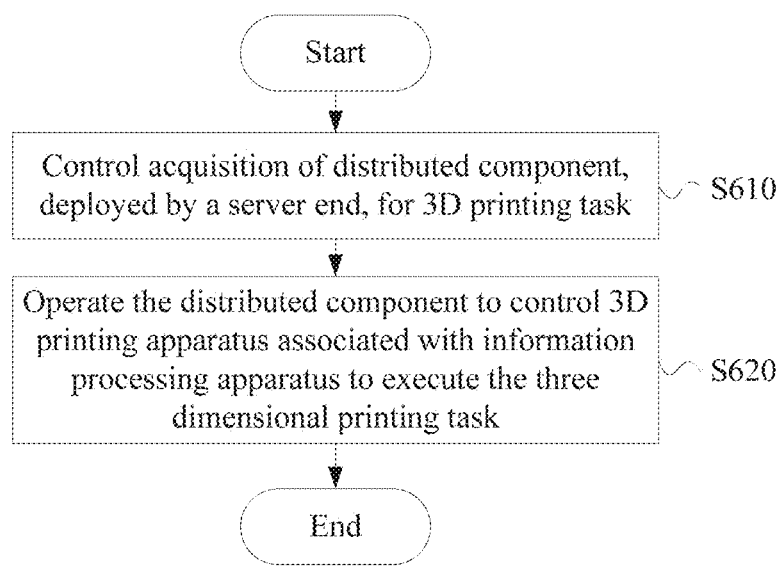
FIG. 6 is a flowchart showing a process example of an information processing method according to an embodiment of the present disclosure.

Accordingly, FIG. 6 shows an information processing method applied to a user equipment end. As shown in FIG. 6, an information processing method according to an embodiment includes the following steps.

In step S610, of a distributed component, deployed by a server end, for a three dimensional printing task is acquired. The distributed component is configured to control execution of the three dimensional printing task independent of a server after establishing connection with the user equipment, and the distributed component contains decryption information with respect to three dimensional model data for the three dimensional printing task.

In step S620, the distributed component is operated to control a three dimensional printing apparatus associated with the information processing apparatus to execute the three dimensional printing task.

Figure 7:
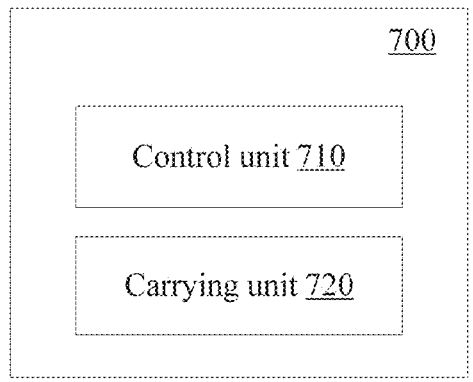
FIG. 7 is a block diagram showing a configuration example of a computer-implemented distributed component according to an embodiment of the present disclosure.

In addition, the embodiment of the present disclosure further includes the above distributed component. FIG. 7 shows a configuration example of a distributed component implemented by a computer according to an embodiment. The distributed component is configured from a server end to a user equipment, for a three dimensional printing task.

As shown in FIG. 7, a distributed component 700 includes a control unit 710 and a carrying unit 720.

The control unit 710 is configured to control execution of a three dimensional printing task independent of a server after connection is established between the distributed component 700 and the user equipment.

The carrying unit 720 is configured to carry decryption information with respect to three dimensional model data for the three dimensional printing task.

According to an embodiment, the control unit 710 is further configured to control authentication information transfer between the user equipment and the three dimensional printing apparatus, for a mutual authentication between the user equipment and the three dimensional printing apparatus.

According to an embodiment, the three dimensional model data for the three dimensional printing task includes primary model data and secondary model data, and the carrying unit 720 is further configured to uniquely carry the secondary model data.

According to an embodiment, the control unit 710 is further configure to clear a model file, a slice file, a temporary file and/or cache data for the three dimensional printing task, during the execution of or after completion of the three dimensional printing task.

According to an embodiment, the control unit 710 is further configured to perform a recovery process on the three dimensional model data subjected to an obfuscation process.

Figure 17:
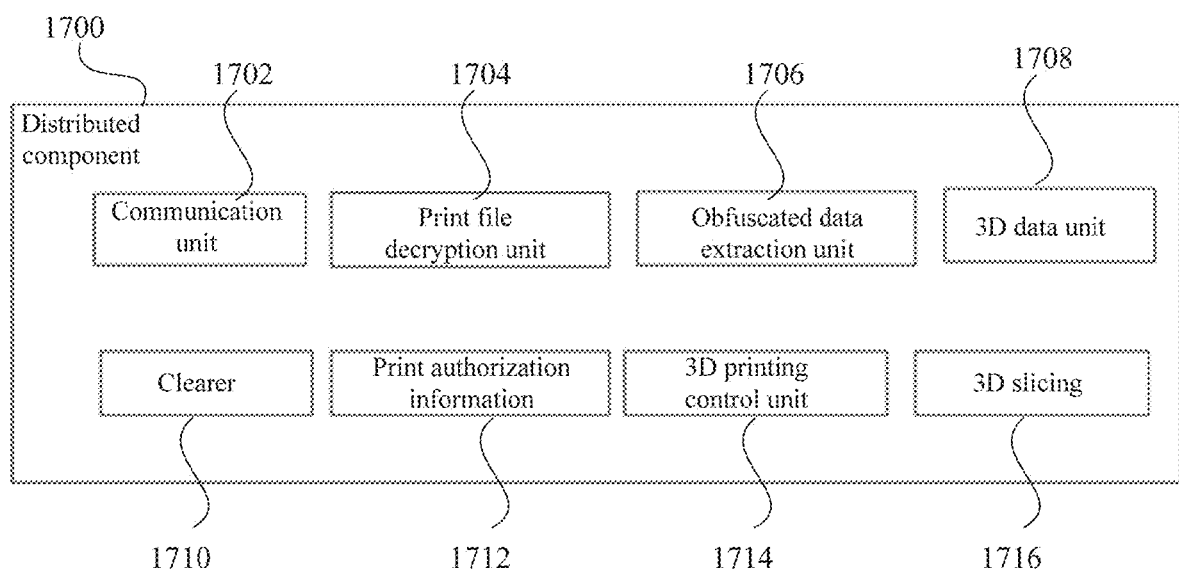
FIG. 17 is a schematic diagram showing a function module structure of an exemplary distributed component.

Next, a configuration example of a distributed component is described with reference to FIG. 17. In the shown example, a distributed component 1700 includes a communication module unit 1702, a print file decryption unit 1704, an obfuscated data extraction unit 1706, a 3D data unit 1708, a clearer 1710, print authorization information 1712, a 3D printing control unit 1714 and a 3D slicing unit 1716.

The communication module unit 1702 is configured to control the distributed component 1700 to communicate with a server. The communication module unit 1702 for example may contain IP or URL information of the server end.

The print file decryption unit 1704 is configured to decrypt 3D print data downloaded from the server.

The obfuscated data extraction unit 1706 is configured to extract a data block from obfuscated data in a correct order.

In the generation of the distributed component at the server end, a portion of data to be printed (corresponding to the aforementioned secondary model data) may be embedded in the 3D data unit 1708. When controlling the printing, the distributed component 1700 may combine the portion of data with primary model data to obtain complete model data.

The clearer 1710 is configured to clear process data, such as cache and temporary files, during the execution of or after completion of the printing, and may unload and delete the distributed component after the printing is completed.

The print authorization information 1712 may carry authorization information on a 3D model corresponding to the 3D printing task.

The 3D printing control unit 1714 is configured to control an associated 3D printing apparatus to complete the 3D printing task.

The 3D slicing unit 1716 is configured to slice the 3D model data at the user equipment.

Processes corresponding to these units are described in the above, of which details are not described here. In addition, the distributed component according to the embodiment of the present disclosure does not necessarily include all of the above exemplary units.

Figure 13:
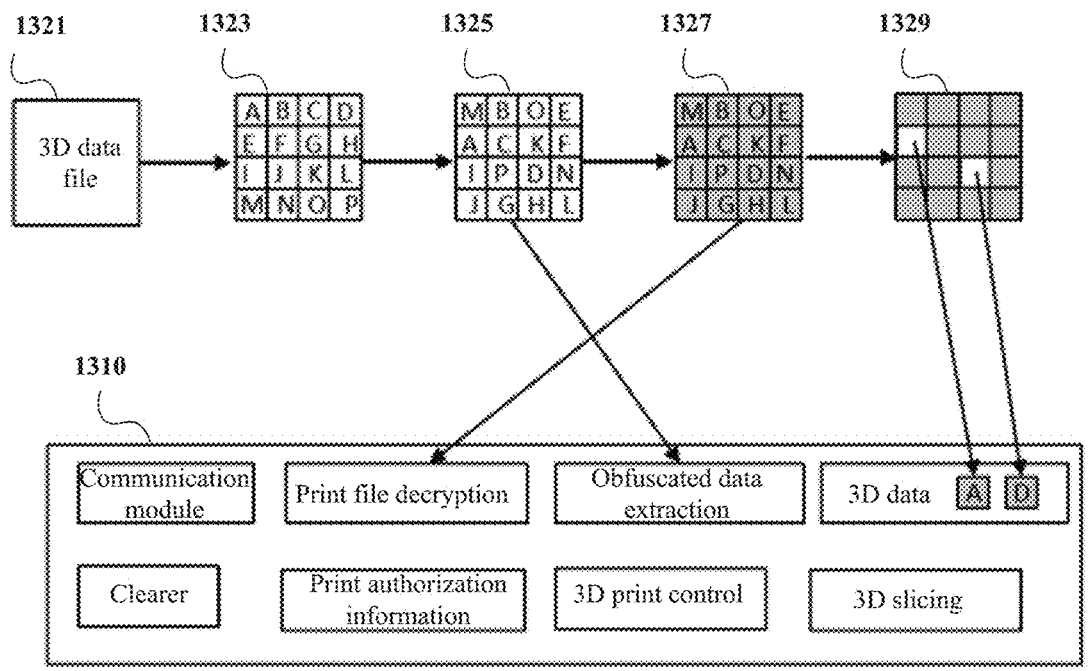
FIG. 13 is a schematic diagram showing an exemplary structure of a distributed component.
Figure 14:
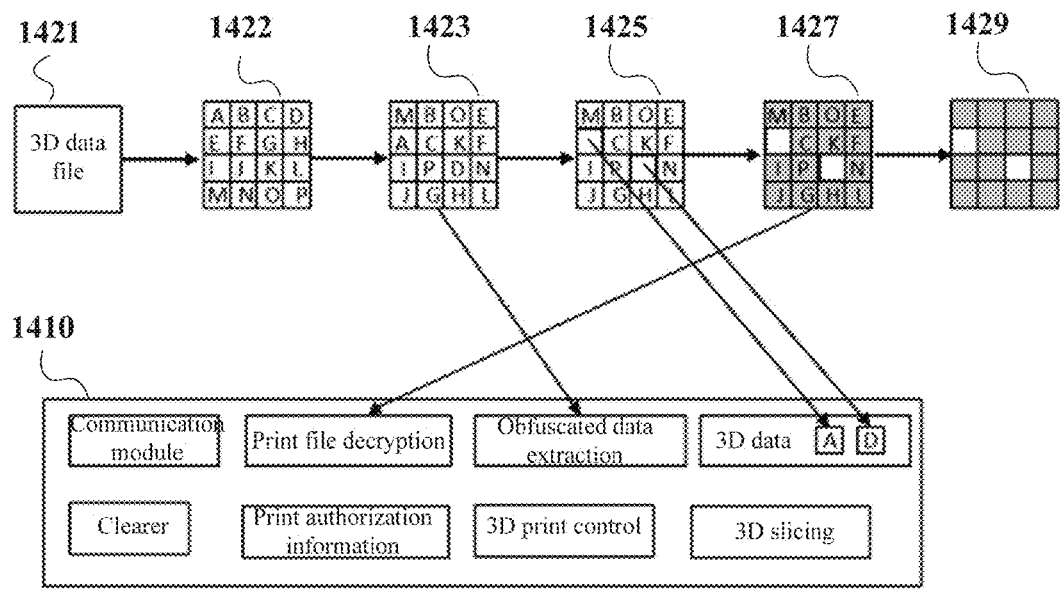
FIG. 14 is a schematic diagram showing another exemplary structure of a distributed component.

FIG. 13 and FIG. 14 are schematic diagrams for illustrating a relationship between a distributed component and 3D model data issued by a server end.

In FIG. 13, in addition to a distributed component 1310, it is schematically shown a 3D data file 1321, fragmentized 3D print data 1323, obfuscated 3D printed data 1325, encrypted 3D print data 1327 and primary 3D print data 1329. It should be noted that, the above illustration is merely illustrative and not restrictive. In addition, in FIG. 13, an arrow between the encrypted data 1327 and the print file decryption unit represents that a decryption process of the distributed component 1310 corresponds to an encryption process for the encrypted data 1327, instead of representing that the distributed component 1310 carries the encrypted data 1327. Similarly, an arrow between the obfuscated data 1325 and the obfuscated data extraction unit represents that an obfuscated data extraction process of the distributed component 1310 corresponds to an obfuscation process for the obfuscated data 1325, instead of representing that the distributed component 1310 carries the obfuscated data 1325.

At the server end, a fragmentization process is performed on the 3D data file 1321 to obtain the data 1323, an obfuscation process is performed on the data 1323 to obtain the data 1325. The obfuscation process is to shuffle the order of data randomly according a certain rule, which may be controlled by a specified algorithm, for example, the order is adjusted based on row and column of a matrix. An encryption process is performed on the data 1325 to obtain the data 1327. A decryption key for example may be hidden in the distributed component 1310. The server end may divide the encrypted data 1327 into two portions, with one portion of data being embedded in the distributed component 1310 and the other portion of data being the data 1329 which is issued separately. Besides, the server end may also package the encrypted print file 1329 and the distributed component 1310 and then issues the package to a client apparatus.

A 3D data file 1421, data 1422, 1423 and 1429 in FIG. 14 are similar to corresponding parts in FIG. 13. An example shown in FIG. 14 differs from the example shown in FIG. 13 in that the division process of the data (1425) is performed before the encryption process of data (1427). In addition, multiple alternatives can be conceived by those skilled in the art to process and issue the data. Besides, in FIG. 14, an arrow between the encrypted data 1427 and the print file decryption unit represents that a decryption process of the distributed component 1410 corresponds to an encryption process for the encrypted data 1427, instead of representing that the distributed component 1410 carries the encrypted data 1427. Similarly, an arrow between the obfuscated data 1423 and the obfuscated data extraction unit represents that an obfuscated data extraction process of the distributed component 1410 corresponds to an obfuscation process for the obfuscated data 1423, instead of representing that the distributed component 1410 carries the obfuscated data 1423.

Figure 15:
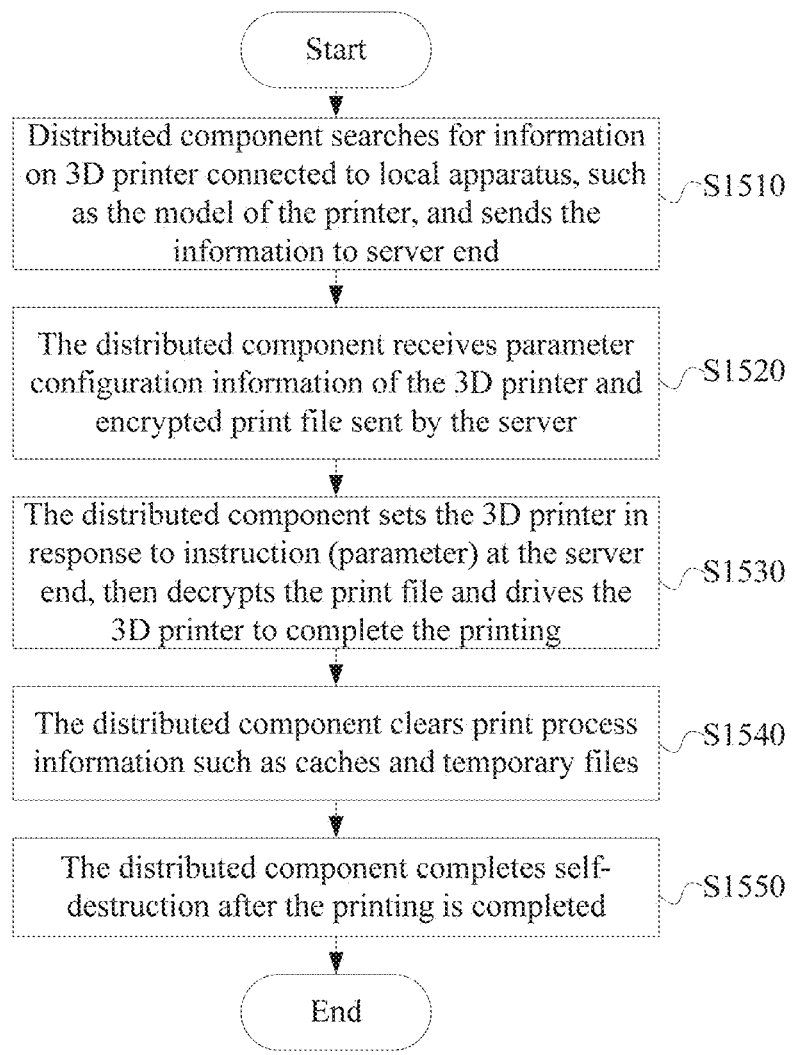
FIG. 15 is a flowchart showing an exemplary process performed by a distributed component.

Below, an example of a process performed by a distributed component after the distributed component is connected to a user equipment is described with reference to FIG. 15. It should be understood that, the distributed component according to the embodiment of the present disclosure unnecessarily perform all of processes in the example.

In step S1510, a distributed component searches for information on a 3D printer connected to a local apparatus, such as the model of the printer, and sends the information to a server end.

In step S1520, the distributed component receives parameter configuration information of the 3D printer and an encrypted print file sent from the server.

In step S1530, the distributed component sets the 3D printer in response to an instruction (parameter) at the server end, and then decrypts the print file and drives the 3D printer to complete the printing.

In step S1540, the distributed component clears print process information such as cache and temporary files.

In step S1550, the distributed component completes a self-destruction after the printing is completed.

Figure 8:
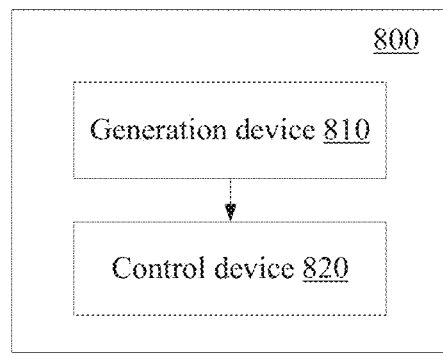
FIG. 8 is a block diagram showing a configuration example of an information processing apparatus according to an embodiment of the present disclosure.

An embodiment of the present disclosure further includes an information processing apparatus applied at a server end. As shown in FIG. 8, an information processing apparatus according to an embodiment includes a generation device 810 and a control device 820. The generation device 810 is configured to generate a distributed component for a three dimensional printing task. The distributed component is configured to control execution of the three dimensional printing task independent of the information processing apparatus after establishing connection with a user equipment. The distributed component contains decryption information with respect to three dimensional model data for the three dimensional printing task. The control device 820 is configured to control deployment of the distributed component to the user equipment.

Figure 9:
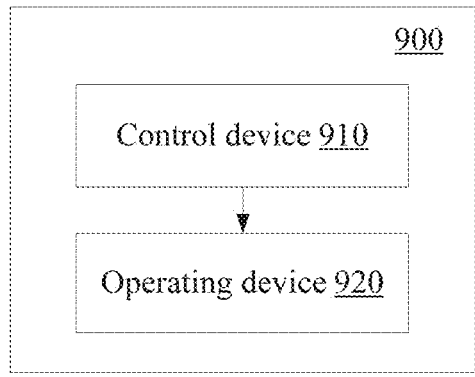
FIG. 9 is a block diagram showing a configuration example of an information processing apparatus according to an embodiment of the present disclosure.

An embodiment of the present disclosure further includes an information processing apparatus applied at a user equipment end. As shown in FIG. 9, an information processing apparatus according to an embodiment includes a control device 910 and an operating device 920. The control unit 910 is configured to control acquisition of a distributed component, deployed by a server end, for a three dimensional printing task. The distributed component is configured to control execution of the three dimensional printing task independent of a server after establishing connection with a user equipment, and the distributed component contains decryption information with respect to three dimensional model data for the three dimensional printing task. The operating device 920 is configured to operate the distributed component to control a three dimensional printing apparatus associated with the information processing apparatus to execute the three dimensional printing task.

As an example, various steps of the methods above and various modules and/or units of the apparatuses above may be implemented as software, firmware, hardware or a combination thereof. In a case of implementing by software or firmware, programs consisting of the software for implementing the methods above are installed to a computer with a dedicated hardware structure (for example a general-purpose computer 1000 shown in FIG. 10) from the storage medium or the network. The computer can perform various types of functions when being installed with various types of programs.

Figure 10:
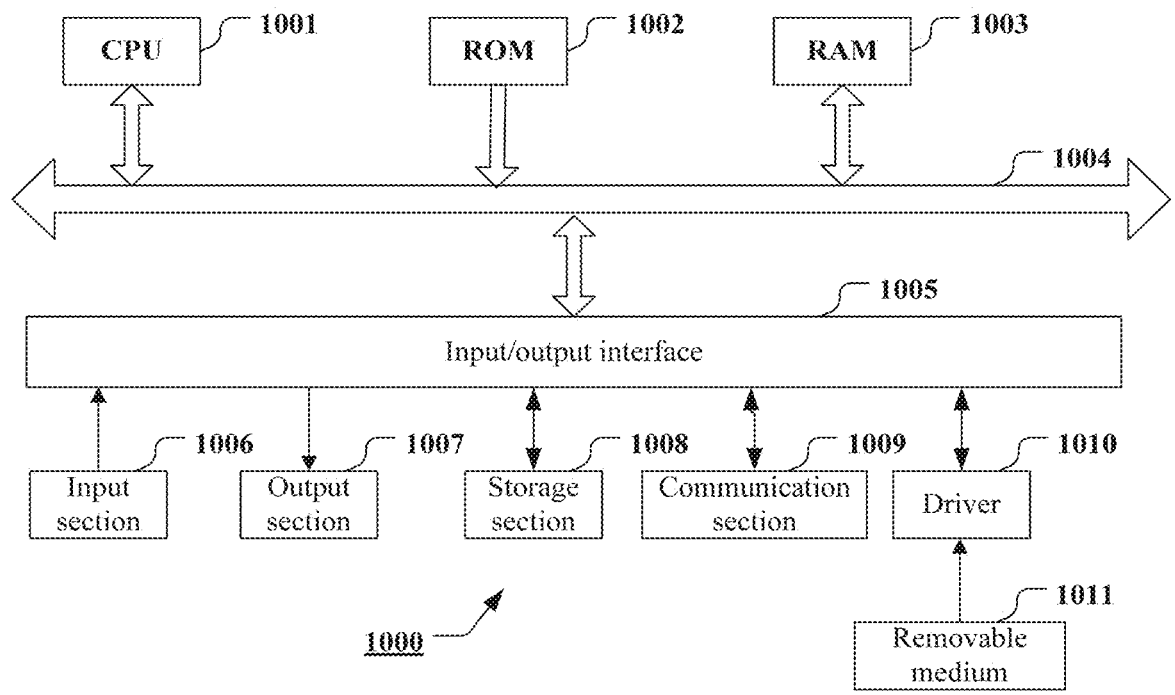
FIG. 10 is a block diagram showing an exemplary structure of a computer implementing a method and an apparatus according to the present disclosure.

In FIG. 10, a central processing unit (CPU) 1001 performs various types of processing according to programs stored in a read only memory (ROM) 1002 or programs loaded from a storage section 1008 to a random access memory (RAM) 1003. Data required when the CPU 1001 performs various types of processing is also stored in the RAM 1003 as needed. The CPU 1001, the ROM 1002 and the RAM 1003 are linked to each other via a bus 1004. An input/output interface 1005 is also linked to the bus 1004.

The following components are linked to the input/output interface 1005: an input section 1006 (including a keyboard, and a mouse and so on), an output section 1007 (including a display, for example a cathode ray tube (CRT) and a liquid crystal display (LCD), and a loudspeaker), a storage section 1008 (including a hard disk and so on), and a communication section 1009 (including a network interface card for example a LAN card, and a modem). The communication section 1009 performs communication processing via a network for example the Internet. A driver 1010 may also be linked to the input/output interface 1005 as needed. A removable medium 1011 for example a magnetic disk, an optical disk, a magnetic-optical disk and a semiconductor memory may be installed on the driver 1010 as needed, such that computer programs read from the removable medium 1011 are installed on the storage section 1008 as needed.

In a case of performing the series of processing described above by software, programs consisting of the software are installed from the network such as the Internet or the storage medium such as the removable medium 1011.

Those skilled in the art should understand that the storage medium is not limited to the removable medium 1011 shown in FIG. 10 which stores programs and is distributed separately from the device to provide the programs to the user. Examples of the removable medium 1011 include: a magnetic disk (including a floppy disk (registered trademark)), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be a hard disk included in the ROM 1002 and the storage section 1008 which stores programs. The storage medium and the device including the storage medium are together distributed to the user.

A program product storing machine readable instruction codes is further provided according to the embodiments of the present disclosure. When the instruction codes are read and executed by a machine, the above method according to the embodiment of the present disclosure can be performed.

Accordingly, a storage medium for carrying the program product storing the machine readable instruction codes is further provided according to the present disclosure. The storage medium includes but is not limited to a floppy disk, an optical disk, a magnetic-optical disk, a storage card and a memory stick and so on.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, without excluding existence or addition of one or more other features, elements, steps or components.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed in other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. An information processing method, comprising:
generating, by processing circuitry, a distributed component by embedding a decryption key and a decryption algorithm for a three dimensional (3D) model into execution codes of the distributed component in a white-box cryptography manner;
generating, by the processing circuitry, an encrypted print file based on a print authorization;
transmitting, by the processing circuitry, the distributed component to user equipment, the user equipment installing the distributed component;
detecting, by the distributed component installed on the user equipment, a 3D printing apparatus connected to the user equipment;
uploading to the processing circuitry, by the distributed component, apparatus information of the user equipment;
issuing, by the processing circuitry, an encrypted 3D model file to the distributed component;
acquiring at least one parameter of the 3D printing apparatus, the parameter being at least one of temperature, speed, filling rate and thickness;
decrypting, by the distributed component, the encrypted 3D model file;
generating slice data of the decrypted 3D model, by the processing circuitry or the distributed component, based on the at least one parameter;
generating printing configuration information based on the at least one parameter; and
enabling execution of a 3D printing task with the slice data and the printing configuration information; and
in response to the printing task being completed, clearing, by the distributed component, cache related to the 3D printing task and the slice data.

2. The information processing method according to claim 1, wherein the distributed component includes user authorization information related to the 3D model, and
the method further includes controlling, by the distributed component, the execution of the 3D printing task based on the authorization information.

3. The information processing method according to claim 2, wherein the authorization information comprises at least one of:
an allowable number of times for printing the 3D model; and
a usage time limit of the 3D model.

4. An information processing apparatus, comprising:
circuitry to:
generate a distributed component by embedding a decryption key and a decryption algorithm for a three dimensional (3D) model into execution codes of the distributed component in a white-box cryptography manner,
generate an encrypted print file based on a print authorization,
transmit the distributed component to user equipment, the user equipment installing the distributed component,
wherein the distributed component is configured to detect a 3D printing apparatus connected to the user equipment and upload to the circuitry apparatus information of the user equipment,
issue an encrypted 3D model file to the distributed component,
acquire at least one parameter of the 3D printing apparatus, the being at least one of temperature, speed, filling rate and thickness,
generate slice data of the decrypted 3D model based on the at least one parameter,
generate printing configuration information based on the parameter, and
control transmission of the slice data and the printing configuration information to the distributed component at the user equipment to enable the execution of the 3D printing task, in response to the printing task being completed, the distributed component is configured to clear cache related to the 3D printing task and the slice data.

5. The information processing apparatus according to claim 4, wherein
the distributed component further includes authorization information related to the 3D model, and
the distributed component is further configured to control the execution of the 3D printing task based on the authorization information.

6. The information processing apparatus according to claim 5, wherein the authorization information comprises at least one of:
an allowable number of times for printing the 3D model; and
a usage time limit of the 3D model.

* * * * *